(12) United States Patent
Zemitis et al.

(10) Patent No.: US 10,947,898 B2
(45) Date of Patent: Mar. 16, 2021

(54) UNDULATING TIP SHROUD FOR USE ON A TURBINE BLADE

(71) Applicant: General Electric Company, Schenectady, NY (US)

(72) Inventors: William Scott Zemitis, Simpsonville, SC (US); Richard Ryan Pilson, Greer, SC (US); Melbourne James Myers, Woodruff, SC (US); Dustin Jaime Muller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 558 days.

(21) Appl. No.: 15/431,859

(22) Filed: Feb. 14, 2017

(65) Prior Publication Data

US 2018/0230806 A1 Aug. 16, 2018

(51) Int. Cl.
*F02C 3/00* (2006.01)
*F02C 3/04* (2006.01)
*F01D 5/22* (2006.01)

(52) U.S. Cl.
CPC .............. *F02C 3/04* (2013.01); *F01D 5/225* (2013.01); *F05D 2240/307* (2013.01); *F05D 2240/81* (2013.01); *F05D 2250/183* (2013.01); *F05D 2250/611* (2013.01); *F05D 2260/20* (2013.01); *Y02T 50/60* (2013.01)

(58) Field of Classification Search
CPC . F01D 5/20; F01D 5/143; F01D 5/181; F01D 5/182; F01D 5/186; F01D 5/187; F01D 5/225; F01D 25/12; F05D 2240/307; F05D 2240/81; F05D 2250/611; F05D 2260/20
See application file for complete search history.

(56) References Cited

U.S. PATENT DOCUMENTS

| | | | |
|---|---|---|---|
| 6,241,471 B1 | 6/2001 | Herron | |
| 6,464,460 B2 | 10/2002 | El-Nashar et al. | |
| 6,811,378 B2 | 11/2004 | Kraft | |
| 7,001,144 B2 | 2/2006 | Urban et al. | |
| 7,762,779 B2 | 7/2010 | Zemitis et al. | |
| 8,057,186 B2 | 11/2011 | Brittingham | |
| 2001/0006600 A1* | 7/2001 | El-Nashar | F01D 5/187 416/92 |
| 2012/0070309 A1 | 3/2012 | Zambetti et al. | |
| 2012/0201695 A1* | 8/2012 | Little | F01D 5/187 416/97 R |
| 2013/0313307 A1* | 11/2013 | Lacy | F01D 5/187 228/165 |
| 2015/0064010 A1* | 3/2015 | Zhang | F01D 5/186 416/189 |
| 2016/0169006 A1 | 6/2016 | Bailiel et al. | |
| 2018/0274371 A1* | 9/2018 | Takamura | F01D 5/186 |

* cited by examiner

*Primary Examiner* — Todd E Manahan
*Assistant Examiner* — Edwin Kang
(74) *Attorney, Agent, or Firm* — Armstrong Teasdale LLP

(57) ABSTRACT

A turbine blade includes an airfoil that includes a root end and a tip end. The tip end is radially spaced from the root end. A tip shroud extends from the tip end. The tip shroud includes a shroud plate. The shroud plate includes a plurality of undulating ridges.

20 Claims, 9 Drawing Sheets

UNDULATING TIP SHROUD FOR USE ON A TURBINE BLADE

BACKGROUND

The field of the disclosure relates generally to rotary machines, and more particularly, to a tip shroud of a turbine blade.

At least some known rotary machines include a compressor, a combustor coupled downstream from the compressor, a turbine coupled downstream from the combustor, and a rotor shaft rotatably coupled between the compressor and the turbine. Some known turbines include at least one rotor disk coupled to the rotor shaft, and a plurality of circumferentially-spaced turbine blades that extend outward from each rotor disk to define a stage of the turbine. Each turbine blade includes an airfoil that extends radially outward from a platform towards a turbine casing.

At least some known turbine blades include a shroud that extends from an outer tip end of the airfoil to reduce gas flow leakage between the airfoil and the turbine casing. An operational life cycle of at least some latter stage turbine blade tip shrouds may be limited by creep. Creep is the tendency of a material to deform over time when exposed to a combination of mechanical loading and high temperature. Turbine shroud creep rate may be greatly impacted by the high temperatures often seen at the shroud. To counter the effects of high temperatures, at least some known turbine blades include an internal cooling circuit, such as an interior tip shroud core cavity, or plenum, and/or passages that run transversely from the plenum toward the outer edges of the shroud. The combination of the plenum or cavity and passages facilitates cooling the shroud and this improves creep performance. However, known tip shroud core plenums generally increase the complexity and expense of manufacture of the tip shroud, and impose design limits on other properties of the shroud, such as shape and thickness.

BRIEF DESCRIPTION

In one aspect, a turbine blade is provided. The turbine blade includes an airfoil that includes a root end and a tip end. The tip end is radially spaced from the root end. A tip shroud extends from the tip end. The tip shroud includes a shroud plate. The shroud plate includes a plurality of undulating ridges.

In another aspect, a turbine blade is provided. The turbine blade includes an airfoil that includes a root end and a tip end. The tip end is radially spaced from the root end. A tip shroud extends from the tip end. The tip shroud includes a plurality of transverse cooling passages and a plurality of undulating ridges. Each of the plurality of undulating ridges circumscribes at least a portion of a corresponding one of the plurality of transverse cooling passages.

In a further aspect, a rotary machine is provided. The rotary machine includes a compressor section, a combustor section coupled downstream from the compressor section, and a turbine section coupled to the compressor section. The turbine section includes at least one turbine blade. The at least one turbine blade includes an airfoil that includes a root end and a tip end. The tip end is radially spaced from the root end. A tip shroud extends from the tip end. The tip shroud includes a shroud plate that includes a plurality of undulating ridges and a plurality of transverse cooling passages defined at least partially within the plurality of undulating ridges.

DRAWINGS

DETAILED DESCRIPTION

The exemplary methods and systems described herein provide a tip shroud that is formed with local undulations in its thickness. The local undulations in thickness facilitate providing a desired stiffness of the tip shroud, such as but not limited to on a hot gas path pressure side of the tip shroud, while requiring less total material in portions of the tip shroud that overhang the airfoil. In addition, the undulations facilitate decreasing bending moments induced to the airfoil by the overhanging regions, while providing smooth transitions between thinner and thicker regions of the shroud. The smoother transitions facilitate reducing aerodynamic losses in gas flow proximate the shroud. In certain embodiments, the localized undulations also further increase thickness of the shroud along a transverse cooling passage path, and thus provide additional material to facilitate formation of transverse cooling passages from an edge of a preformed shroud plate into flow communication with a radial airfoil cooling passage. In some embodiments, the local undulations also enable a tip shroud to be fabricated that does not require a tip shroud core plenum.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a gas turbine engine, and the term "downstream" refers to an aft or nozzle end of the gas turbine engine.

Figure 1:
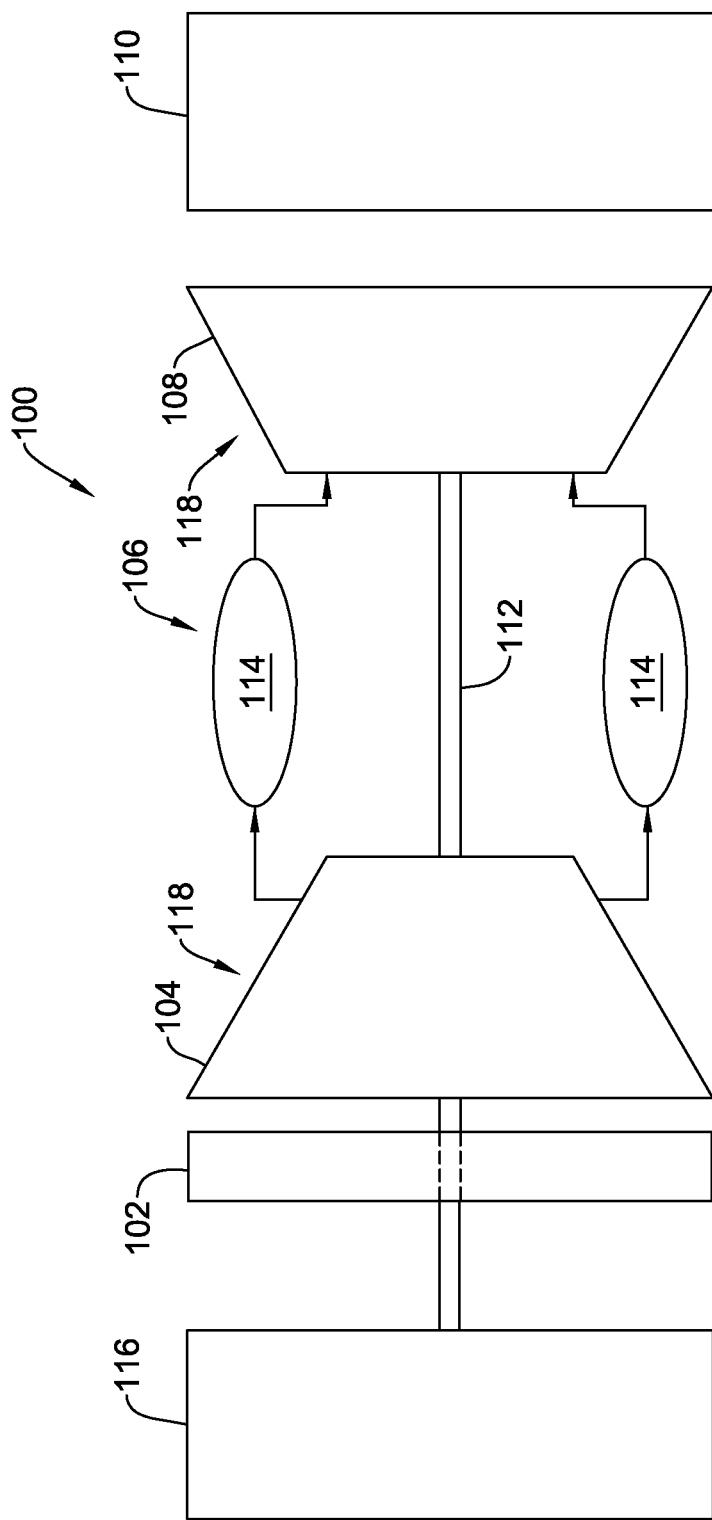
FIG. 1 is a schematic view of an exemplary rotary machine.

FIG. 1 is a schematic view of an exemplary rotary machine 100, i.e., a turbomachine, and more specifically a turbine engine. In the exemplary embodiment, turbine engine 100 is a gas turbine engine. Alternatively, turbine engine 100 may be any other turbine engine and/or rotary machine, including, without limitation, a steam turbine engine, a gas turbofan aircraft engine, other aircraft engine, a wind turbine, a compressor, and a pump. In the exemplary embodiment, turbine engine system 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. In the exemplary embodiment, combustor section 106 includes a plurality of combustors 114. Combustor section 106 is coupled to compressor section 104 such that each combustor 114 is in flow communication with the compressor section 104. Turbine section 108 is further coupled to a load 116 such as, but not limited to, an electrical generator and/or a mechanical drive application. In the exemplary embodiment, each compressor section 104 and turbine section 108 includes at least one rotor assembly 118 that is coupled to rotor shaft 112.

During operation, intake section 102 channels air towards compressor section 104. Compressor section 104 compresses air and discharges compressed air into combustor section 106 and towards turbine section 108 (shown in FIG. 1). The majority of air discharged from compressor section 104 is channeled towards combustor section 106. More specifically, pressurized compressed air is channeled to combustors 114 (shown in FIG. 1) wherein the air is mixed with fuel and ignited to generate high temperature combustion gases. The combustion gases are channeled towards a combustion gas path 232 (shown in FIG. 2), wherein the gases impinge upon turbine blades 204 (shown in FIG. 2) and stator vanes 202 (shown in FIG. 2) of turbine section 108 to facilitate imparting a rotational force on rotor assembly 118. At least a portion of the combustion gas that impinges turbine blades 204, is channeled between a tip shroud 236 (shown in FIG. 2) and turbine casing 210 (shown in FIG. 2).

Figure 2:
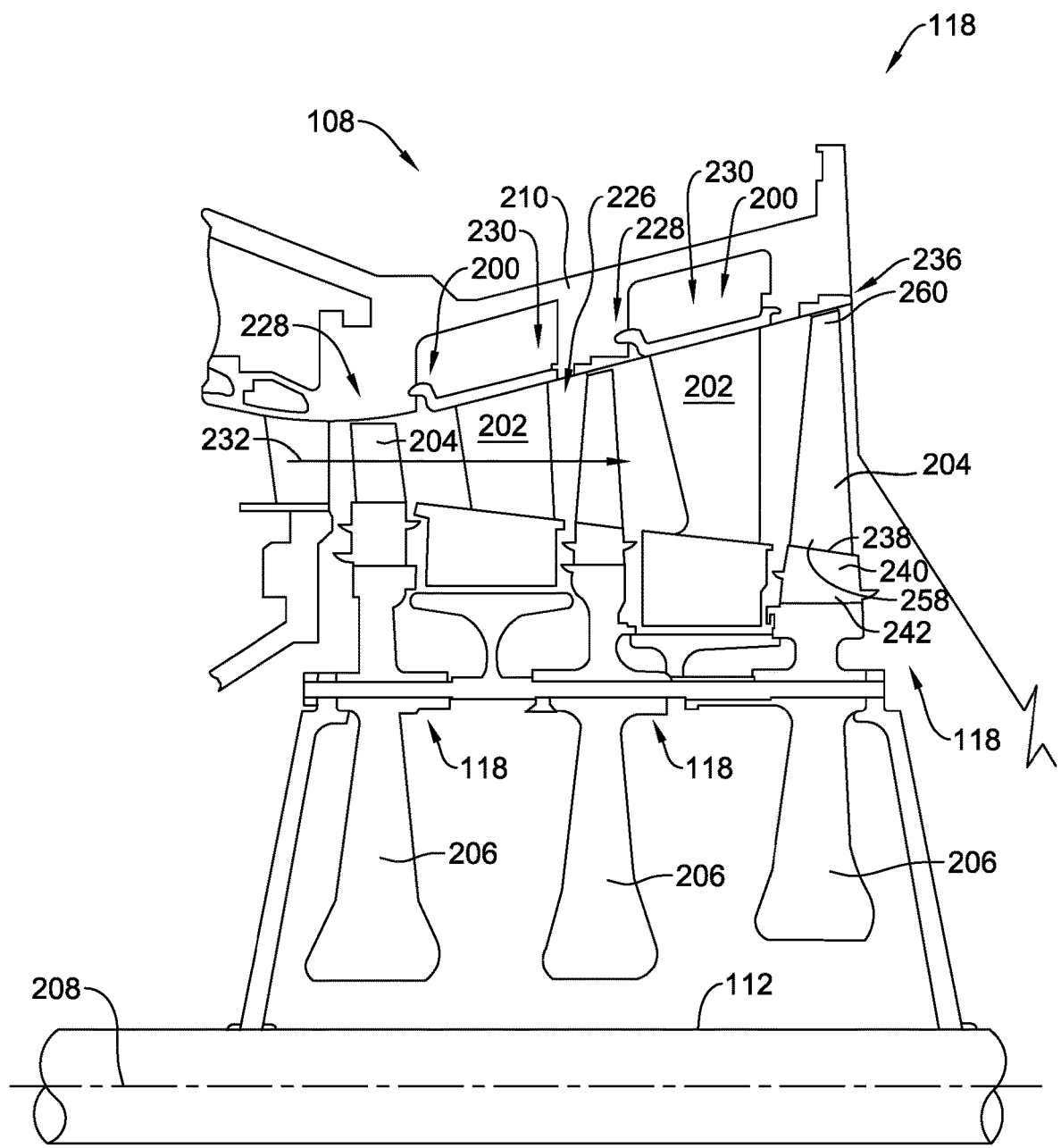
FIG. 2 is a partial sectional view of a portion of an exemplary rotor assembly that may be used with the exemplary rotary machine shown in FIG. 1.
Figure 3:
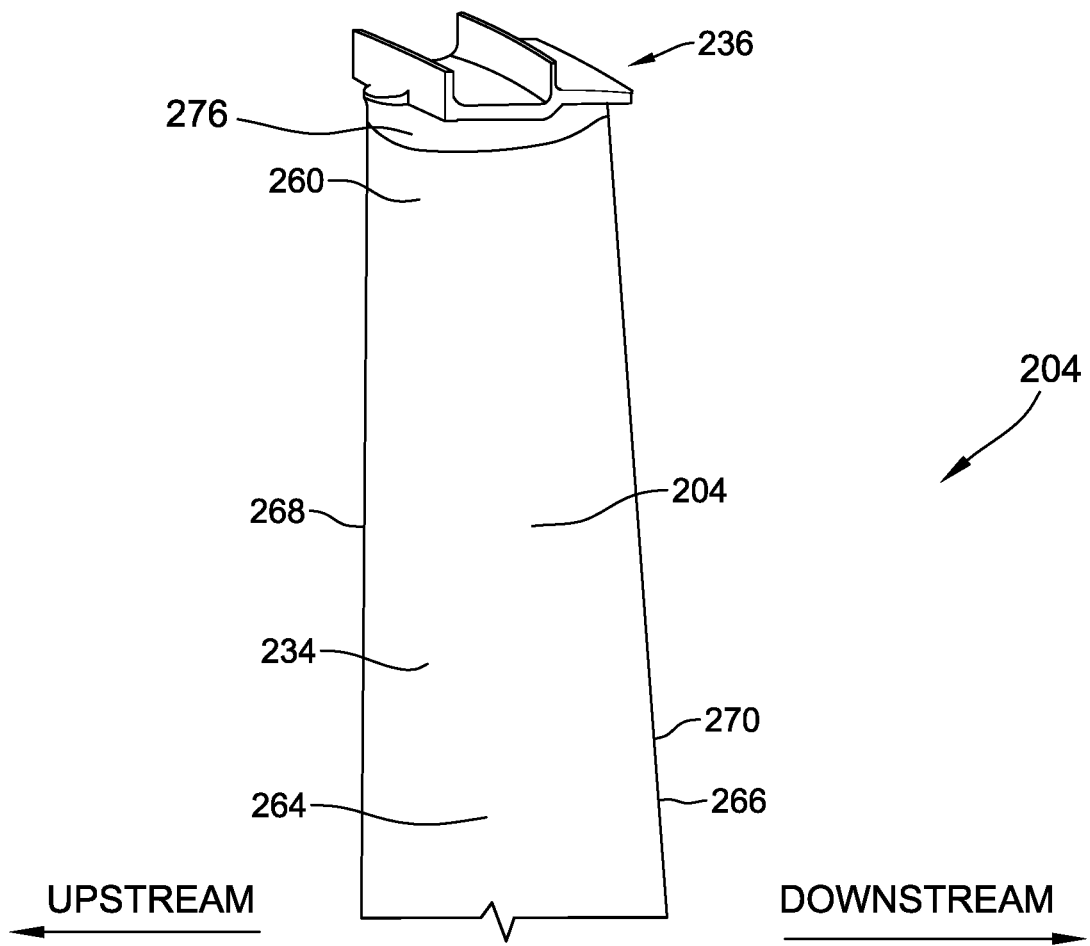
FIG. 3 is a perspective view of a pressure side of an exemplary turbine blade that may be used with the rotor assembly shown in FIG. 2.

FIG. 2 is a partial sectional view of a portion of an exemplary rotor assembly 118. FIG. 3 is a perspective view of a pressure side 264 of an exemplary turbine blade 204. In the exemplary embodiment, turbine section 108 includes a plurality of stages 200 that each include a stationary row 230 of stator vanes 202 and a corresponding row 228 of rotating turbine blades 204. Turbine blades 204 in each row 228 are spaced-circumferentially about, and each extends radially outward from, a rotor disk 206. Each rotor disk 206 is coupled to rotor shaft 112 and rotates about a centerline axis 208 that is defined by rotor shaft 112. A turbine casing 210 extends circumferentially about rotor assembly 118 and stator vanes 202. Stator vanes 202 are each coupled to turbine casing 210, and each extends radially inward from casing 210 towards rotor shaft 112. A combustion gas path 232 is defined between turbine casing 210 and each rotor disk 206. Each row 228 and 230 of turbine blades 204 and stator vanes 202 extends at least partially through a portion of combustion gas path 232.

In the exemplary embodiment, each turbine blade 204 includes an airfoil 234, a tip shroud 236, a platform 238, a shank 240, and a dovetail 242. Airfoil 234 extends generally radially between platform 238 and tip shroud 236. Platform 238 extends between airfoil 234 and shank 240 and is oriented such that each airfoil 234 extends radially outwardly from platform 238 towards turbine casing 210. Shank 240 extends radially inwardly from platform 238 to dovetail 242. Dovetail 242 extends radially inwardly from shank 240 and enables turbine blades 204 to securely couple to rotor disk 206 (shown in FIG. 2).

In the exemplary embodiment, airfoil 234 extends radially between a root end 258, adjacent to platform 238, and a tip end 260 spaced radially outward from root end 258. Airfoil 234 extends radially outwardly from platform 238 towards turbine casing 210 (shown in FIG. 2) such that tip end 260 is positioned adjacent to turbine casing 210. In the exemplary embodiment, airfoil 234 has pressure side 264 and an opposite suction side 266. Each side 264 and 266 extends generally axially between a leading edge 268 and a trailing edge 270. Pressure side 264 is generally concave and suction side 266 is generally convex. In the exemplary embodiment, tip shroud 236 extends from tip end 260 of airfoil 234 and between tip end 260 and turbine casing 210.

Figure 4:
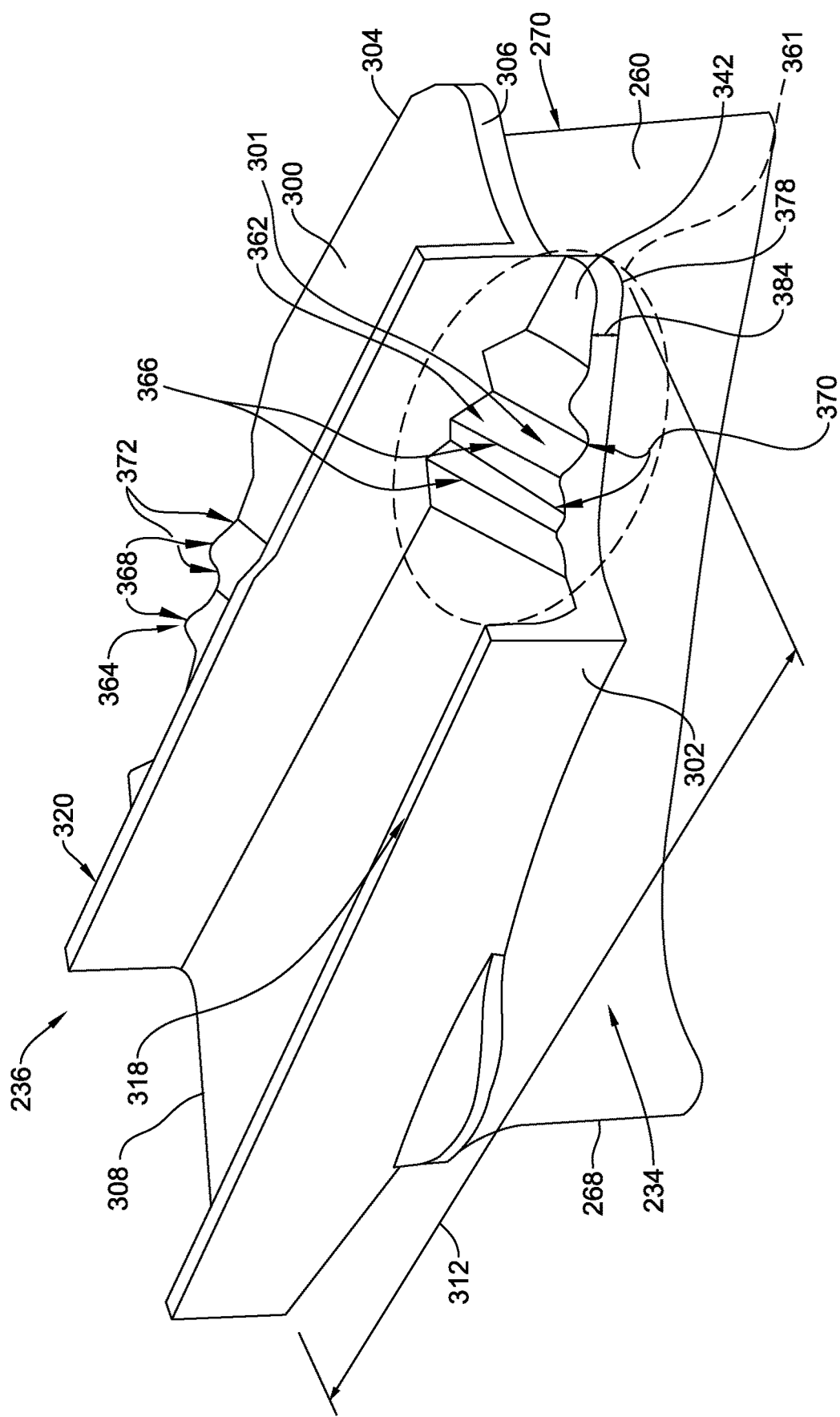
FIG. 4 is a perspective view of an exemplary tip shroud that may be used with the turbine blade shown in FIG. 3.
Figure 5:
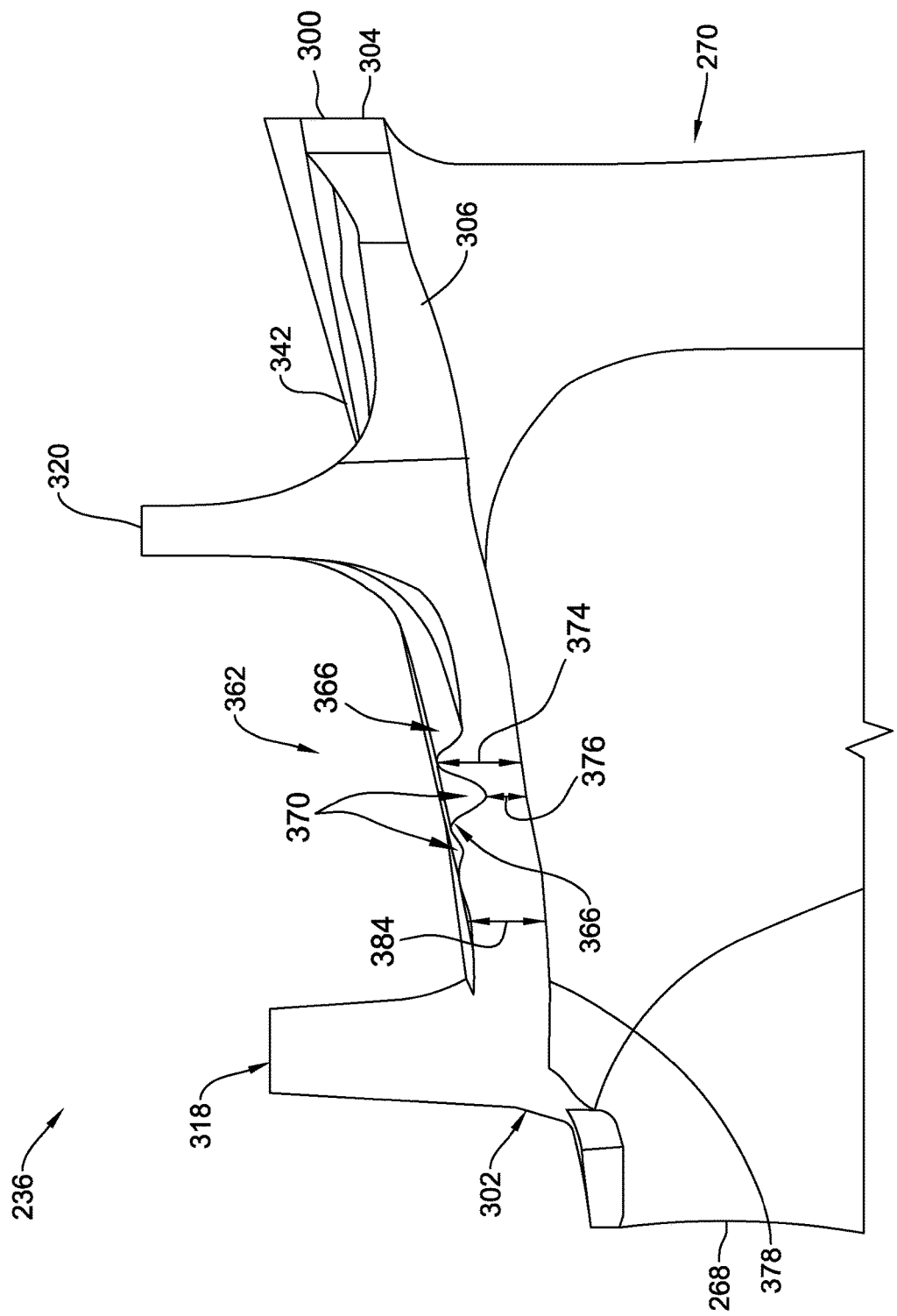
FIG. 5 is a side elevational view of a pressure side of the tip shroud shown in FIG. 4.
Figure 6:
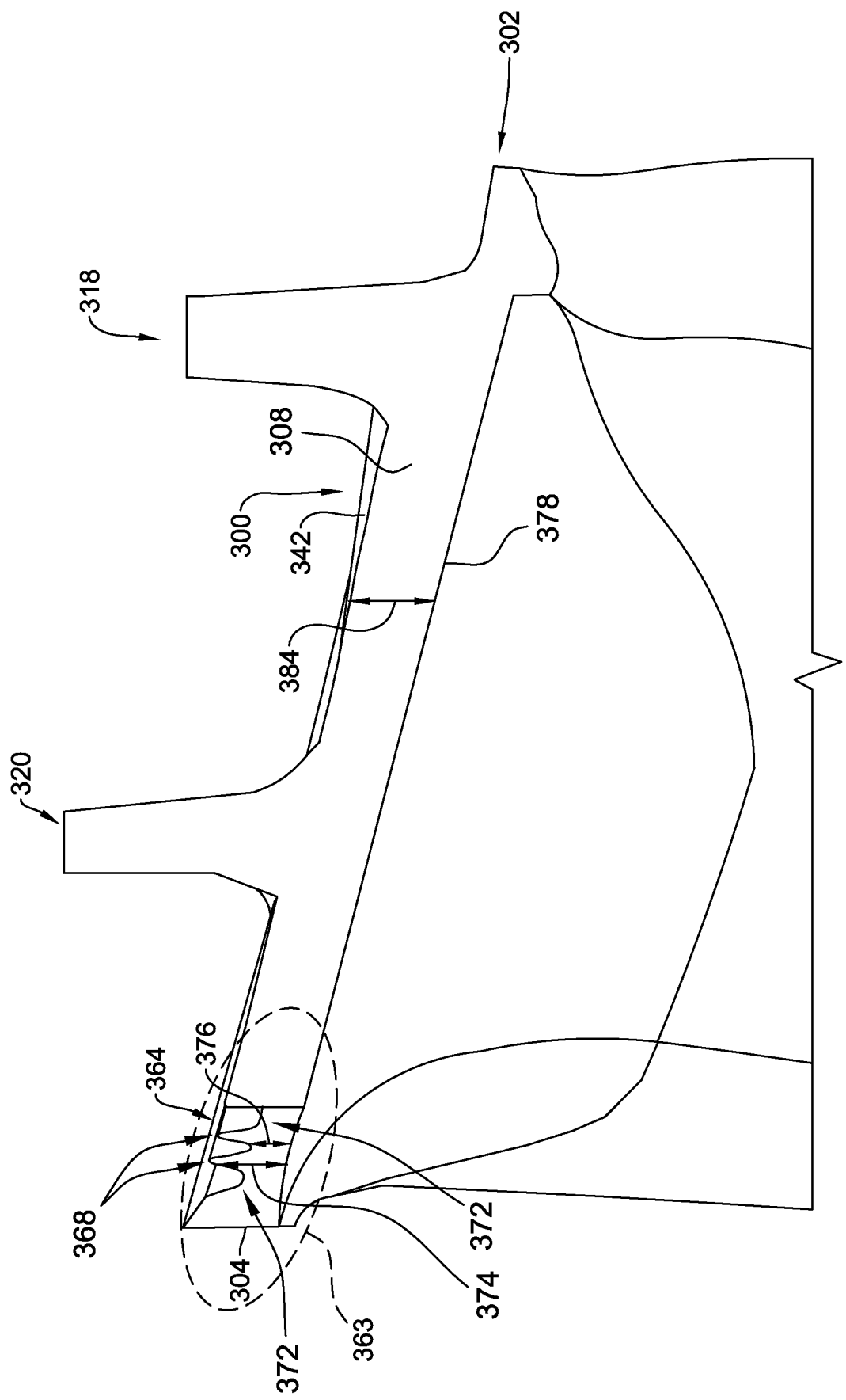
FIG. 6 is a side elevational view of a suction side of the tip shroud shown in FIG. 4.
Figure 7:
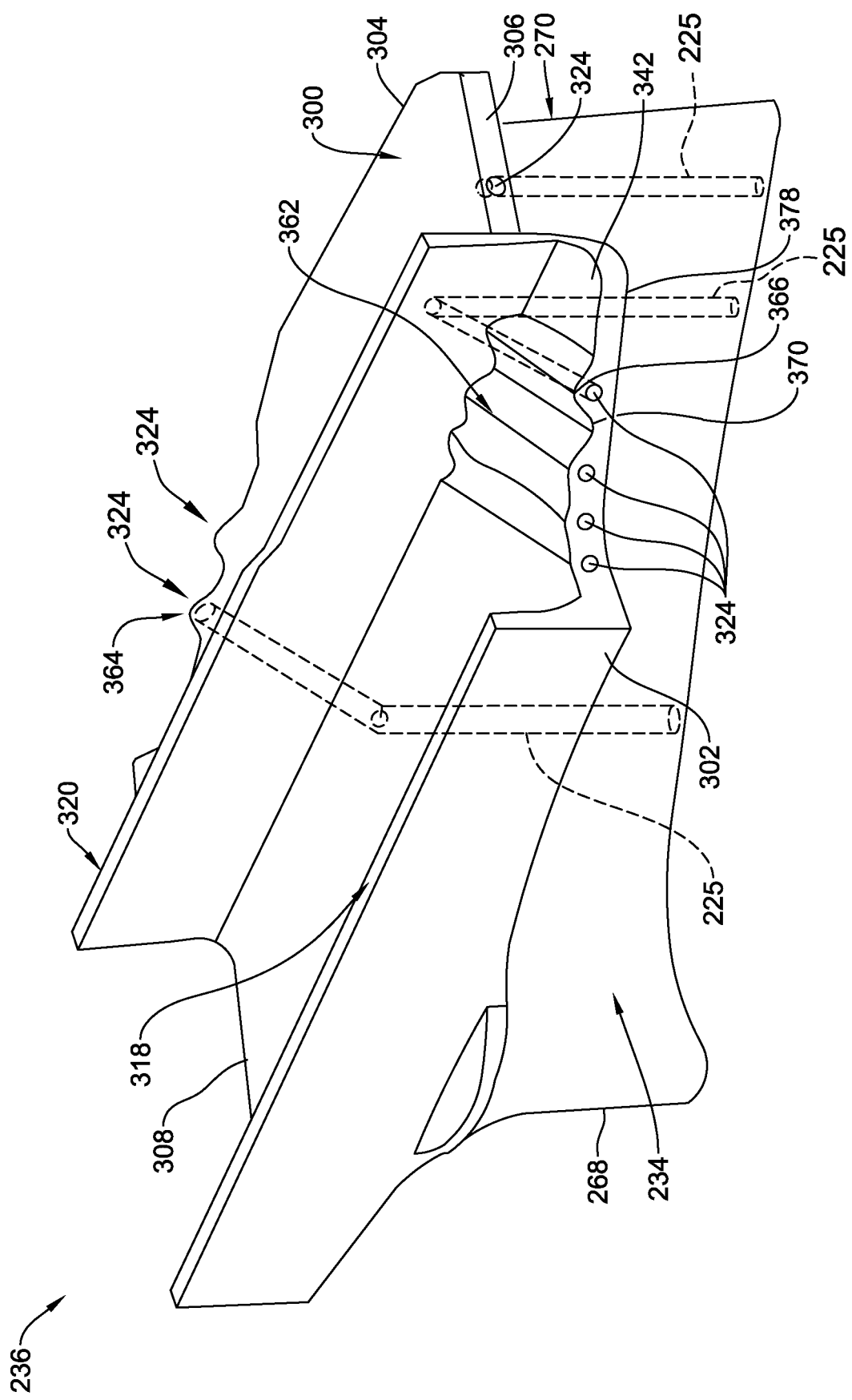
FIG. 7 is a perspective view of the exemplary tip shroud shown in FIG. 4 including a plurality of cooling passages defined therein.
Figure 9:
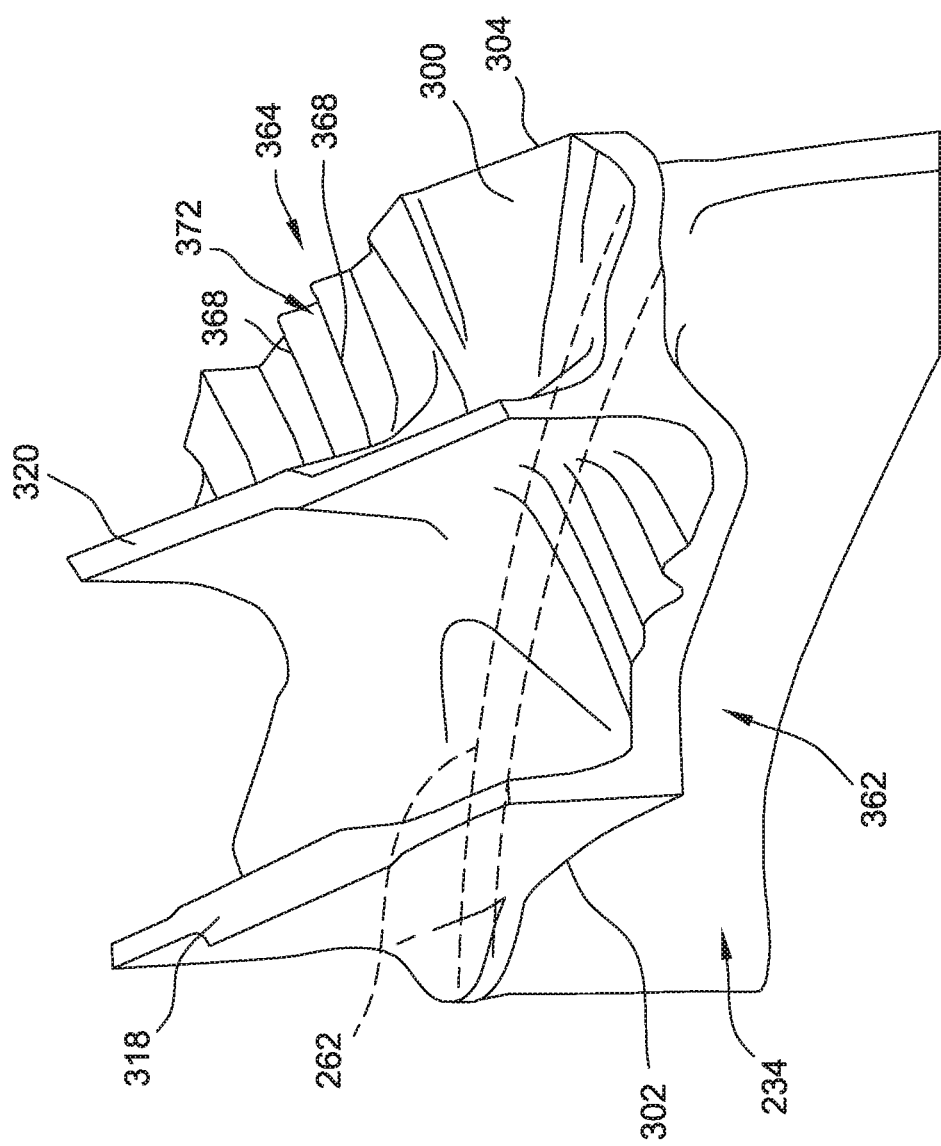
FIG. 9 is a perspective top view of the exemplary tip shroud shown in FIG. 4.

FIG. 4 is a perspective view of an exemplary tip shroud 236, FIG. 5 is a side elevational view of a pressure side 264 of tip shroud 236, FIG. 6 is a side elevation view of a suction side 266 of tip shroud 236, FIG. 7 is a perspective view of an exemplary tip shroud 236 similar to the tip shroud shown in FIGS. 4-6, and including cooling passages 324 defined therein, and FIG. 9 is a perspective top view of an exemplary tip shroud 236 similar to the tip shroud shown in FIGS. 4-6, illustrating a position of undulating ridges on overhanging portions of tip shroud 236 with respect to an exemplary airfoil profile 262 (shown in dashed lines).

In the exemplary embodiment, with reference to FIGS. 4-7, tip shroud 236 includes a shroud plate 300. Shroud plate 300 is generally rectangular and extends axially between a leading edge 302 and an opposite trailing edge 304, and circumferentially between a first, or pressure side edge 306 and an opposite second, or suction side edge 308. Shroud plate 300 extends radially between an inner surface 378 and an outer surface 342, and has a radial thickness 384 defined therebetween which may vary across shroud plate 300. In alternative embodiments shroud plate thickness 384 is substantially constant. In the exemplary embodiment, shroud plate 300 has a circumferential width 312 defined between side edges 306 and 308.

In the exemplary embodiment, tip shroud 236 includes a first shroud rail 318 and a second shroud rail 320 that each extend radially outward from shroud plate 300 towards turbine casing 210 (shown in FIG. 2). In alternative embodiments, tip shroud 236 may include any suitable number of shroud rails. In one embodiment, shroud rails 318 and 320 are formed separately from, and coupled to, shroud plate 300. In an alternative embodiment, shroud rails 318 and 320 are formed integrally with shroud plate 300. In the exemplary embodiment, shroud rails 318 and 320 extend generally radially from shroud plate outer surface 342 and between shroud plate outer surface 342 and turbine casing 210.

In the exemplary embodiment, shroud plate outer surface 342 includes a first plurality of undulating ridges 362. Ridges 362 are defined between first shroud rail 318 and second shroud rail 320 and are adjacent to airfoil pressure side 264. In the exemplary embodiment, ridges 362 emanate from second shroud rail 320 and extend to first side edge 306, adjacent to airfoil pressure side 264. In alternative embodiments, ridges 362 may extend from any other suitable location on tip shroud plate 300 to any suitable location on tip shroud plate 300 that enables ridges 362 to function as described herein.

Also in the exemplary embodiment, shroud plate outer surface 342 includes a second plurality of undulating ridges 364. Ridges 364 are defined between second shroud rail 320 and trailing edge 304 and are adjacent to airfoil suction side 266. In the exemplary embodiment, ridges 364 emanate from second shroud rail 320 and extend to trailing edge 304 adjacent to airfoil suction side 266. In alternative embodiments, ridges 364 may extend from any other suitable location on tip shroud plate 300 to any suitable location on tip shroud plate 300 that enables ridges 364 to function as described herein. In alternative embodiments, shroud plate outer surface 342 includes either, but not both, of first plurality of undulating ridges 362 and second plurality of undulating ridges 364.

Ridges 362 and 364 are defined by a plurality of peaks 366 and 368, and a plurality of valleys 370 and 372 respectively. In the exemplary embodiment, a local peak thickness 374 for each ridge 362 and 364 is defined between a respective peak 366 or 368 and shroud plate inner surface 378, and a local valley thickness 376 is defined between each respective valley 370 or 372 and shroud plate inner surface 378. Variations in local thickness 384 between each peak 366 or 368 and a corresponding valley 370 or 372 on opposing sides of that peak 366 or 368 define each undulating ridge 362 and 364 in tip shroud plate 300. An undulation 301 is defined as a smooth transition between adjacent locally thinner and thicker regions of tip shroud 236, such as between local thickness 374 of peak 366 and local thickness 376 of adjacent valley 370, or between local thickness 374 of peak 368 and local thickness 376 of adjacent valley 372, on shroud plate outer surface 342. In some embodiments, at least one peak thickness 374 is different from at least one other peak thickness 374. Similarly, in some embodiments, at least one valley thickness 376 is different from at least one other valley thickness 376.

In the exemplary embodiment, ridges 362 are spaced from each other and are sized to provide a desired stiffness to a selected first region 361 of tip shroud 236. More specifically, a size and spacing of peaks 366 and valleys 370 of ridges 362 are selected to provide stiffness to first region 361 such that a valley thickness 376 and/or a thickness of other regions of shroud plate 300 adjacent to pressure side 264 of airfoil 234 are reduced relative to a thickness 384 of a comparably stiff non-undulating shroud plate. As such, ridges 362 facilitate enabling an overall reduction in total material used to fabricate shroud plate 300 adjacent to pressure side 264 of tip shroud 236. As such, a decrease in a bending moment induced on airfoil 234 by pressure side overhang of tip shroud 236 is facilitated to be reduced by ridges 362.

Similarly in the exemplary embodiment, ridges 364 are spaced from each other and are sized to provide a desired stiffness to a selected second region 363 of tip shroud 236. More specifically, a size and spacing of peaks 368 and valleys 374 of ridges 364 are selected to provide stiffness to second region 363 such that a valley thickness 376 and/or a thickness of other regions of shroud plate 300 adjacent to suction side 266 of airfoil 234 are reduced relative to a thickness 384 of a comparably stiff non-undulating shroud plate, thereby enabling an overall reduction in total material used to fabricate shroud plate 300 adjacent to suction side 266 of tip shroud 236. As such, a decrease in a bending moment induced on airfoil 234 by suction side overhang of tip shroud 236 is facilitated to be reduced by ridges 364.

Additionally or alternatively, in some embodiments, a location of at least one of ridges 362 and 364 are selected to at least partially coincide with a path of transverse cooling passages 324 (shown in FIG. 7) defined within shroud plate 300. For example, in the exemplary embodiment, a first subset of cooling passages 324 extend from adjacent airfoil tip end 260, such as between airfoil trailing edge 270 and second rail 320, to first side 306. A second subset of cooling passages 324 extend from adjacent airfoil tip end 260, such as between second rail 320 and first rail 318, to trailing edge 304. Each cooling passage 324 is defined at least partially within one of ridges 362 or 364, such that each undulating ridge circumscribes at least a portion of a corresponding cooling passage 324. In alternative embodiments, each cooling passage 324 extends within tip shroud plate 300 from and to any suitable location that enables turbine blade 204 to function as described herein.

In some embodiments, ridges 362 and/or ridges 364 facilitate enabling an increased thickness 384 of shroud 236 coincident with the path of transverse cooling passages 324, providing sufficient local material thickness 384 to enable drilling of each transverse cooling passage 324 through shroud plate 300 from a respective edge of shroud plate 300 into flow communication with a respective radially extending cooling passage 225 defined within airfoil 234. Although only three radial cooling passages are shown in FIG. 7 for clarity, it should be understood that additional radial cooling passages 225 may be defined in airfoil 234 and correspond to others of transverse cooling passages 324. Thus, a tip shroud plenum, and relatively expensive and complex casting methods to form tip shroud plenums and/or tip shroud passages, are not required. As such, in some embodiments, ridges 362 and/or ridges 364 facilitate fabricating cooling passages 324 by less expensive mechanical or electrochemical drilling methods, for example.

Figure 8:
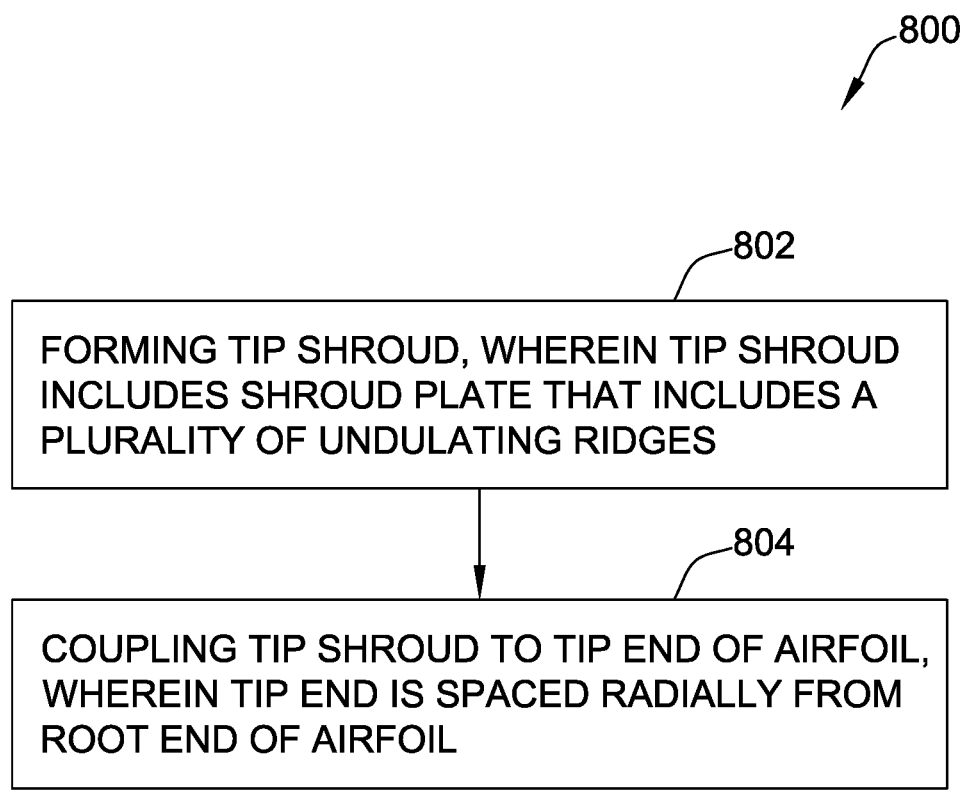
FIG. 8 is a flow diagram of an exemplary method of fabricating a turbine blade, such as the turbine blade shown in FIG. 3.

FIG. 8 is a flow diagram of an exemplary method 800 of fabricating a turbine blade, such as turbine blade 204. In the exemplary embodiment, method 800 includes forming 802 a tip shroud, such as tip shroud 236. The tip shroud includes a shroud plate, such as shroud plate 300, that includes a plurality of undulating ridges, such as at least one of first plurality of undulating ridges 362 and second plurality of undulating ridges 364. Method 800 also includes coupling 804 the tip shroud to a tip end of an airfoil, such as tip end 260. The tip end is spaced radially from a root end of the airfoil, such as root end 258.

The above-described embodiments overcome at least some disadvantages of known turbine blades by providing a tip shroud that facilitates improving creep performance. More specifically, the embodiments described herein provide a tip shroud that includes local undulations in thickness. The local undulations facilitate maintaining a desired stiffness of the tip shroud, such as but not limited to on a hot gas path pressure side of the tip shroud, while reducing an amount of material used to fabricate portions of the tip shroud that overhang the airfoil. Thus, a bending moment induced on the airfoil by the overhanging regions is facilitated to be decreased. In addition, the localized undulations provide smooth transitions between thinner and thicker regions of the shroud, thus reducing aerodynamic losses in gas flow proximate the shroud. In certain embodiments, the localized undulations further provide increased thickness of the shroud along a transverse cooling passage path, and as such provide sufficient material to facilitate formation of transverse cooling passages from an edge of a preformed shroud plate into flow communication with a radial airfoil cooling passage. In some embodiments, the local undulations enable the formation of a tip shroud that does not require a tip shroud core plenum and/or cast-in shroud plate cooling passages, resulting in decreasing a cost of manufacture of the turbine blade.

Exemplary embodiments of an undulating tip shroud for use on a turbine blade are described above in detail. The methods and apparatus are not limited to the specific embodiments described herein, but rather, components of systems and/or steps of the method may be utilized independently and separately from other components and/or steps described herein. For example, the methods and apparatus may also be used in combination with other combustion systems and methods, and are not limited to practice with only the gas turbine engine assembly as described herein. Rather, the exemplary embodiment may be implemented and utilized in connection with many other combustion system applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine blade comprising:
   an airfoil comprising a root end and a tip end, said tip end radially spaced from said root end; and
   a tip shroud extending from said tip end, said tip shroud comprising a shroud plate that comprises:
   an overhanging portion;
   a first shroud rail adjacent to a leading edge of said shroud plate;
   a second shroud rail downstream from said first shroud rail; and
   a plurality of undulating ridges defined on said overhanging portion of said shroud plate, said plurality of undulating ridges defined by at least one peak and at least one valley, wherein said at least one valley has a first thickness, and wherein a portion of said shroud plate between said plurality of undulating ridges and one of said first shroud rail and said second shroud rail has a second thickness, the first thickness being less than the second thickness.

2. The turbine blade in accordance with claim 1, wherein said plurality of undulating ridges emanate from at least one of said first shroud rail and said second shroud rail.

3. The turbine blade in accordance with claim 1, wherein said plurality of undulating ridges extend to a first side edge of said shroud plate adjacent to a pressure side of said airfoil.

4. The turbine blade in accordance with claim 1, wherein said plurality of undulating ridges extend to a trailing edge of said shroud plate adjacent to a suction side of said airfoil.

5. The turbine blade in accordance with claim 1, wherein said plurality of undulating ridges are defined between said first shroud rail and said second shroud rail and are adjacent a pressure side of said airfoil.

6. The turbine blade in accordance with claim 1, wherein said plurality of undulating ridges are defined between said second shroud rail and a trailing edge of said shroud plate and adjacent a suction side of said airfoil.

7. The turbine blade in accordance with claim 1, wherein said plurality of undulating ridges comprises:
   a first plurality of undulating ridges defined between said first shroud rail and said second shroud rail and adjacent a pressure side of said airfoil; and
   a second plurality of undulating ridges defined between said second shroud rail and a trailing edge of said shroud plate and adjacent a suction side of said airfoil.

8. The turbine blade in accordance with claim 1, wherein said shroud plate further comprises a plurality of transverse cooling passages defined therein, each of said plurality of undulating ridges circumscribes at least a portion of a corresponding one of said plurality of transverse cooling passages.

9. The turbine blade in accordance with claim 8, wherein a subset of said plurality of transverse cooling passages extend from adjacent said tip end to a first side of said shroud plate.

10. The turbine blade in accordance with claim 8, wherein a subset of said plurality of transverse cooling passages extend from adjacent said tip end to a trailing edge of said shroud plate.

11. The turbine blade in accordance with claim 8, wherein each of said plurality of transverse cooling passages is in flow communication with a corresponding radially extending cooling passage defined in said airfoil.

12. A turbine blade comprising:
    an airfoil comprising a root end and a tip end, said tip end radially spaced from said root end; and
    a tip shroud extending from said tip end, said tip shroud comprising:
    an overhanging portion;
    a first shroud rail adjacent to a leading edge of said shroud plate:
    a second shroud rail downstream from said first shroud rail;
    a plurality of transverse cooling passages defined within said tip shroud and extending within said overhanging portion; and
    a plurality of undulating ridges, each of said plurality of undulating ridges circumscribes at least a portion of a corresponding one of said plurality of transverse cooling passages along said overhanging portion, said plurality of undulating ridges defined by at least one peak and at least one valley, wherein said at least one valley has a first thickness, and wherein a portion of said shroud plate between said plurality of undulating ridges and one of said first shroud rail and said second shroud rail has a second thickness, the first thickness being less than the second thickness.

13. The turbine blade in accordance with claim 12, wherein a subset of said plurality of transverse cooling passages extend from adjacent said tip end to a first side of said shroud plate.

14. The turbine blade in accordance with claim 12, wherein a subset of said plurality of transverse cooling passages extend from adjacent said tip end to a trailing edge of said shroud plate.

15. The turbine blade in accordance with claim 12, wherein each of said plurality of transverse cooling passages is in flow communication with a corresponding radially extending cooling passage defined in said airfoil.

16. A rotary machine comprising:
    a compressor section;

a combustor section coupled downstream from said compressor section;

a turbine section coupled to said compressor section, said turbine section comprising at least one turbine blade comprising:

an airfoil comprising a root end and a tip end, said tip end radially spaced from said root end in a radial direction, said airfoil defining an airfoil profile adjacent to said tip in a plane transverse to the radial direction; and a tip shroud extending from said tip end, said tip shroud comprising:

a shroud plate that comprises a plurality of undulating ridges, a first shroud rail adjacent to a leading edge of said shroud plate, and a second shroud rail downstream from said first shroud rail, said plurality of undulating ridges defined by at least one peak and at least one valley, said at least one peak and said at least one valley extending transversely outside said airfoil profile, wherein said at least one valley has a first thickness, and wherein a portion of said shroud plate between said plurality of undulating ridges and one of said first shroud rail and said second shroud rail has a second thickness, the first thickness being less than the second thickness; and a plurality of transverse cooling passages defined at least partially within said plurality of undulating ridges.

17. The rotary machine in accordance with claim 16, wherein each of said plurality of undulating ridges circumscribes at least a portion of a corresponding one of said plurality of transverse cooling passages.

18. The rotary machine in accordance with claim 16, wherein said plurality of undulating ridges comprises:

a first plurality of undulating ridges defined between said first shroud rail and said second shroud rail and adjacent a pressure side of said airfoil; and a second plurality of undulating ridges defined between said second shroud rail and a trailing edge of said shroud plate and adjacent a suction side of said airfoil.

19. The rotary machine in accordance with claim 16, wherein a subset of said plurality of transverse cooling passages extend from each of (i) adjacent said tip end to a first side of said shroud plate, and (ii) adjacent said tip end to a trailing edge of said shroud plate.

20. The rotary machine in accordance with claim 16, wherein each of said plurality of transverse cooling passages is in flow communication with a corresponding radially extending cooling passage defined in said airfoil.

\* \* \* \* \*